(12) United States Patent
Dölger

(10) Patent No.: US 7,600,377 B2
(45) Date of Patent: Oct. 13, 2009

(54) HYDROSTATIC DRIVE SYSTEM

(75) Inventor: Marcus Dölger, Haibach (DE)

(73) Assignee: Linde Material Handling GmbH, Aschaffenburg (DE)

( * ) Notice: Subject to any disclaimer, the term of this patent is extended or adjusted under 35 U.S.C. 154(b) by 394 days.

(21) Appl. No.: 11/592,014

(22) Filed: Nov. 2, 2006

(65) Prior Publication Data
US 2007/0107423 A1  May 17, 2007

(30) Foreign Application Priority Data
Nov. 3, 2005 (DE) ............... 10 2005 052 523
Jan. 17, 2006 (DE) ............... 10 2006 002 269

(51) Int. Cl.
*F16H 39/02* (2006.01)
*E02F 9/22* (2006.01)

(52) U.S. Cl. ............................. 60/422; 60/459
(58) Field of Classification Search .......... 60/422, 60/459
See application file for complete search history.

(56) References Cited

U.S. PATENT DOCUMENTS 4,694,647 A * 9/1987 Yoshida ................ 60/442
6,199,442 B1 * 3/2001 Bauer et al. ............ 74/411.5

FOREIGN PATENT DOCUMENTS

| DE | 197 09 958 A1 | 9/1998 |
| DE | 19709958 A1 * | 9/1998 |
| DE | 102006040459 A1 * | 3/2007 |

* cited by examiner

*Primary Examiner*—Thomas E Lazo
(74) *Attorney, Agent, or Firm*—The Webb Law Firm

(57) ABSTRACT

A hydrostatic drive system has a pump (1) and at least one consumer (5) controlled by a control valve (4) that can be actuated by control signals. A precharge device (10) that generates a precharge pressure is located in a reservoir line (7) that leads from the control valve (4) to a reservoir (2). The precharge device can be pressurized as a function of the control signals of the control valve (4). To make possible a recharge during the deceleration of a consumer, the precharge device (10) can be pressurized in the direction of an elevation of the precharge pressure when there is a decreasing control signal of the control valve (4).

15 Claims, 1 Drawing Sheet

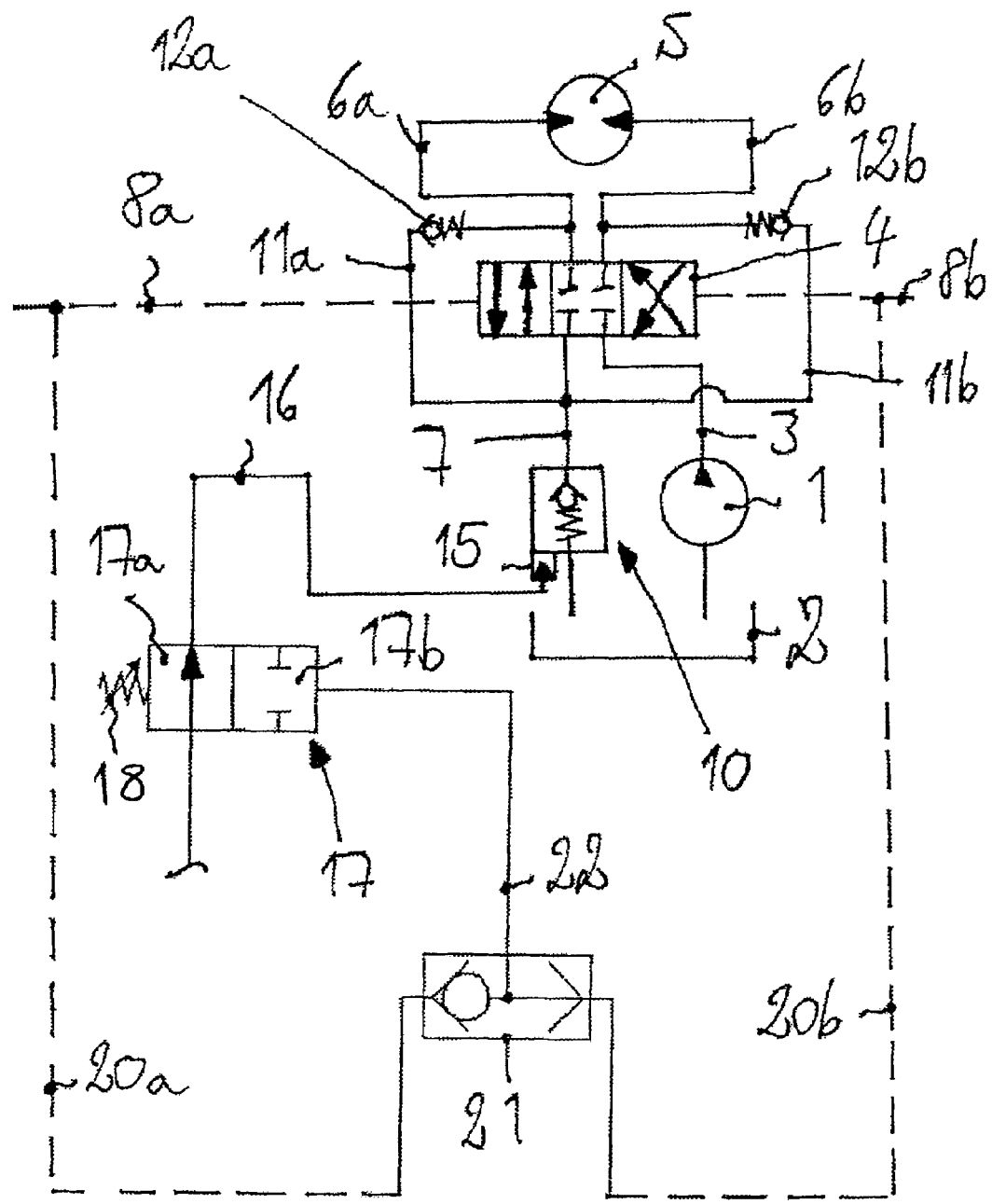

HYDROSTATIC DRIVE SYSTEM

CROSS REFERENCE TO RELATED APPLICATIONS

This application claims priority to German Application No. 10 2005 052 523.7, filed Nov. 3, 2005, and German Application No. 10 2006 002 269.6, filed Jan. 17, 2006, both of which applications are herein incorporated by reference in their entirety.

BACKGROUND OF THE INVENTION

1. Field of the Invention

This invention relates to a hydrostatic drive system with a pump and at least one consumer that can be controlled by a control valve actuated by control signals. A precharge device that generates a precharge pressure is located in a reservoir line that leads from the control valve to a reservoir and can be pressurized as a function of the control signals from the control valve.

2. Technical Considerations

On some drive systems, a precharge device is provided in the reservoir line to generate an elevated precharge pressure in the reservoir line under certain operating conditions. This precharge pressure can effect a recharging of pressure fluid from the reservoir line into the admission side of the consumer. As a result of which, any underfilling and cavitation of the consumer can be prevented.

A similar drive system is described in DE 197 09 958 A1. In that case, the precharge valve located in the reservoir line can be set to an elevated precharge pressure with an increasing control signal of a control valve. When the control valve is actuated, a negative load is controlled by the control signal. As a result, under operating conditions in which the consumer controls a negative load, a recharging from the reservoir line into the admission side of the consumer can be effected.

However, in drive systems of this type, operating conditions can also occur in which a recharge is necessary in the event of a reduction of the control signal of the control valve to decelerate the consumer. With these known drive systems in which the precharge device is pressurized as the control signal increases in the direction of an increase of the precharge pressure, a recharge cannot be achieved under such operating conditions.

Therefore, it is an object of the invention to provide a hydrostatic drive system of the general type described above but which makes recharging possible when a consumer is decelerated.

SUMMARY OF THE INVENTION

The invention teaches that when the control signal of the control valve decreases, the precharge device can be pressurized in the direction of an increase of the precharge pressure. The invention thereby teaches that when the control signal of the control valve decreases, as a result of which the control valve is moved into the neutral position and the consumer is decelerated, the precharge of the precharge device increases and thereby makes possible a recharge of pressure fluid from the reservoir line into the admission side of the consumer. With a control of the precharge device in accordance with the invention, a recharge can therefore be guaranteed under operating conditions in which the consumer is decelerated by a reduction of the control signal and, thus, cavitation and underfilling can be effectively and easily prevented on the admission side during the deceleration of the consumer.

In one preferred realization of the invention, the precharge device has a control surface that acts in the direction of an increase of the precharge pressure. The control surface is in a functional connection with a control pressure line. An on-off valve that can be actuated by the control signal of the control valve is located in the control pressure line. With an on-off valve of this type, it is easily possible, as a function of the control signal of the control valve, to control the pressurization of the precharge valve by the control pressure to an elevated precharge pressure.

In one preferred embodiment of the invention, the on-off valve has a flow position and a shutoff position. The on-off valve can be actuated by a spring toward the flow position and by the control signal of the control valve to the shutoff position. It is thereby possible in a simple manner to ensure that when the control signal of the control valve is reduced, the on-off valve is pushed by the spring into the flow position and, thus, the precharge valve is pressurized by the control pressure in the control pressure line to an elevated precharge pressure. As the control pressure decreases and there is a deceleration of the consumer, it is an easy matter in terms of control technology to generate an elevated precharge pressure in the reservoir line and, thus, to ensure a recharging.

In one preferred development of the invention, the consumer is a double-acting consumer, with a shuttle valve device provided for the selection of the control signal of the control valve. On a double-acting consumer (the control valve of which can be actuated by two control signals), a recharging can thus be achieved for both directions of movement during the deceleration of the consumer and a decrease of the control signal.

The pressure in the control pressure line and the precharge device in the direction of an elevation of the precharge pressure can be a constant pressure, such as a feed pressure, for example, of the drive system.

Particular advantages can be achieved if the control pressure line is a brake line that conducts a braking air pressure from a braking device. With the braking air pressure that is present in the brake line of a braking device that can be realized in the form of a spring-loaded brake, for example, the precharge device can be easily pressurized to an elevated precharge pressure. In this case, it is advantageous if, during the deceleration of the consumer and the braking air pressure applied, the precharge device can be pressurized to an elevated precharge pressure. After the deceleration process of the consumer, during which process the braking air pressure collapses, the precharge pressure is lowered to the normal precharge pressure.

In one preferred embodiment of the invention, the consumer is a slewing gear motor of a slewing gear of a mobile piece of equipment, such as an excavator. On a slewing gear, the deceleration and, thus, the braking of the slewing gear are initiated by a reduction of the control signals of the control valve. By controlling the precharge device of the invention, an elevated precharge pressure can thereby be generated in the reservoir line. As a result of which, during the deceleration of the slewing gear, it becomes possible to recharge pressure fluid from the reservoir line into the admission side of the slewing gear motor and, thus, to effectively and easily prevent underfilling and cavitation in the slewing gear motor.

BRIEF DESCRIPTION OF THE DRAWING

Additional advantages and details of the invention are explained in greater detail below on the basis of the exemplary embodiment illustrated in the accompanying drawing FIGURE which is a schematic diagram of a hydrostatic drive system of the invention.

DESCRIPTION OF THE PREFERRED EMBODIMENT

The hydrostatic drive system has a pump 1 that sucks pressure fluid from a reservoir 2 and delivers it into a delivery line 3. The delivery line 3 is connected to a control valve 4 which is provided for the control of a consumer 5. The consumer 5 can be, and purely by way of example, a slewing gear motor of a slewing gear of a mobile piece of equipment, such as an excavator. The control valve 4 is, in this case, in communication by means of pressure fluid lines 6a, 6b with the consumer 5 and is connected to a reservoir line 7 that leads to the reservoir 2. The control valve 4 can, in this case, be actuated by means of control signals in the form of control pressures in control signal lines 8a, 8b.

Located in the reservoir line 7 is a precharge device 10 in the form of a stop valve, which is in the form of a spring-loaded check valve and opens toward the reservoir 2.

Connected to the pressure fluid lines 6a, 6b are bypass lines 11a, 11b, which are in communication with the reservoir line 7 upstream of the precharge device 10. In the bypass lines 11a, 11b, there are recharge valves 12a, 12b that can be in the form of check valves, for example, and open toward the pressure fluid lines 6a, 6b.

The invention teaches that the precharge device 10 is provided with a control surface 15 that acts to increase the precharge pressure and is in a functional connection with a control pressure line 16.

In this case, the control pressure line 16 is in the form of a brake line that transports a braking air pressure to a braking device, for example a spring-loaded brake. In the control pressure line 16, there is an on-off valve 17 that can be actuated by the control signals of the control valve 4. The on-off valve 17 in this case has a flow position 17a and a shutoff position 17b, and can be pushed toward the flow position 17a by means of a spring 18 and toward the shutoff position 17b by means of the control signals of the control valve 4.

For this purpose, branch lines 20a, 20b are connected to the control signal lines 8a, 8b and lead on the input side to a shuttle valve device 21. Connected to the output of the shuttle valve device 21 is a control pressure line 22 which is in communication with a control surface of the on-off valve 17 that acts in the direction of the shutoff position 17b.

When the slewing gear is actuated, the control valve 4 is actuated by a control signal that is present in the control signal line 8a or 8b toward the right or left switched position illustrated in the FIGURE. The control signal that is present in the control signal line 8a or 8b is also present via the branch lines 20a and 20b via the shuttle valve device 21, and via the control pressure line 22 at the on-off-valve 17 and actuates the on-off valve 17 into the shutoff position 17b, in which case, the communication between the control pressure line 16 carrying the braking air pressure and the control surface 15 is blocked. The precharge device 10 is, thus, at a minimal precharge pressure that is determined by the spring, as a result of which the slewing gear can be operated at low loss.

To decelerate the slewing gear and, thus, to slow down the slewing gear, the control signal present in the control signal lines 8a and 8b is reduced. As a result of which, the control valve 4 is moved into the illustrated neutral position. If the control signal of the control valve 4 that actuates the on-off valve 17 by means of the control pressure line 22, the shuttle valve device 21, and the branch lines 20a and 20b fall below the setting of the spring 18, the on-off valve 17 is moved by the spring 18 into the flow position 17a, in which case, the braking air pressure present in the control pressure line 16 is available at the control surface 15 and the precharge device 10 is set to an elevated precharge pressure. A recharging of pressure fluid into the admission-side pressure fluid line 6a or 6b can thereby be achieved. As a result of the elevated precharge pressure generated by means of the precharge device 10 in the reservoir line 7, via the bypass lines 11a and 11b, and the open recharge valves 12a and 12b, a recharge of pressure fluid from the reservoir line 7 into the admission side of the consumer 5 can be achieved, thereby easily preventing underfilling and cavitation in the consumer 5 during the deceleration and, thus, the slowing down of the slewing gear.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic drive system, comprising:
    a pump;
    at least one consumer controlled by a control valve that can be actuated by control signals; and
    a precharge device that generates a precharge pressure and is located in a reservoir line that leads from the control valve to the reservoir, which precharge device can be pressurized as a function of the control signals of the control valve,
    wherein the precharge device can be pressurized in a direction of an elevation of the precharge pressure when there is a decreasing control signal of the control valve.

2. The hydrostatic drive system as claimed in claim 1, wherein the precharge device has a control surface that acts in the direction of an elevation of the precharge pressure and is functionally connected to a control pressure line, and wherein an on-off valve that can be actuated by the control signal of the control valve is located in the control pressure line.

3. The hydrostatic drive system as claimed in claim 2, wherein the on-off valve has a flow position and a shutoff position, wherein the on-off valve can be pushed toward the flow position by a spring and toward the shutoff position by the control signal of the control valve.

4. The hydrostatic drive system as claimed in claim 3, wherein the consumer comprises a double-acting consumer, and a shuttle valve device is provided for selection of the control signal of the control valve.

5. The hydrostatic drive system as claimed in claim 3, wherein the control pressure line is a brake line that carries a braking air pressure to a braking device.

6. The hydrostatic drive system as claimed in claim 3, wherein the consumer comprises a slewing gear motor of a slewing gear of a mobile piece of equipment.

7. The hydrostatic drive system as claimed in claim 2, wherein the control pressure line is a brake line that carries a braking air pressure to a braking device.

8. The hydrostatic drive system as claimed in claim 7, wherein the consumer comprises a slewing gear motor of a slewing gear of a mobile piece of equipment.

9. The hydrostatic drive system as claimed in claim 2, wherein the consumer comprises a double-acting consumer, and a shuttle valve device is provided for selection of the control signal of the control valve.

10. The hydrostatic drive system as claimed in claim 2, wherein the consumer comprises a slewing gear motor of a slewing gear of a mobile piece of equipment.

11. The hydrostatic drive system as claimed in claim 1, wherein the consumer comprises a double-acting consumer, and a shuffle valve device is provided for selection of the control signal of the control valve.

12. The hydrostatic drive system as claimed in claim 11, wherein the consumer comprises a slewing gear motor of a slewing gear of a mobile piece of equipment.

13. The hydrostatic drive system as claimed in claim 1, wherein the consumer comprises a slewing gear motor of a slewing gear of a mobile piece of equipment.

14. The hydrostatic drive system as claimed in claim 13, wherein the equipment is an excavator.

15. A hydrostatic drive system, comprising:
   a pump;
   at least one consumer controlled by a control valve that can be actuated by control signals;
   a precharge device that generates a precharge pressure and is located in a reservoir line that leads from the control valve to a reservoir, the precharge device being pressurized as a function of the control signals of the control valve; and
   an on-off valve located in a control pressure line and actuated between a flow position and a shutoff position by the control signals of the control valve,
   wherein the precharge device has a control surface that acts in the direction of an elevation of a precharge pressure, the control surface being functionally connected to the control pressure line, and wherein the on-off valve is in the flow position during a decreased control signal of the control valve.

* * * * *

UNITED STATES PATENT AND TRADEMARK OFFICE
CERTIFICATE OF CORRECTION

| | |
|---|---|
| PATENT NO. | : 7,600,377 B2 |
| APPLICATION NO. | : 11/592014 |
| DATED | : October 13, 2009 |
| INVENTOR(S) | : Dölger |

Page 1 of 1

It is certified that error appears in the above-identified patent and that said Letters Patent is hereby corrected as shown below:

Column 5, Line 1 of Claim 11, "shuffle valve" should read -- shuttle valve --

Signed and Sealed this

Second Day of February, 2010

David J. Kappos
*Director of the United States Patent and Trademark Office*